United States Patent [19]
Bateman

[11] 3,937,575
[45] Feb. 10, 1976

[54] ELECTRO-OPTICAL RANGING MEANS

[75] Inventor: George H. Bateman, Winter Park, Fla.

[73] Assignee: Martin Marietta Corporation, Orlando, Fla.

[22] Filed: Nov. 26, 1973

[21] Appl. No.: 419,171

[52] U.S. Cl. .................... 356/5; 250/212; 250/552
[51] Int. Cl.² ...................... H01L 9/00; G01C 3/08
[58] Field of Search ............. 250/552, 212; 356/4, 5

[56] References Cited
UNITED STATES PATENTS

| | | | |
|---|---|---|---|
| 3,409,368 | 11/1968 | Fernandez | 356/5 |
| 3,443,166 | 5/1969 | Ing, Jr. et al. | 250/552 |
| 3,508,828 | 4/1970 | Froome et al. | 356/5 |

Primary Examiner—Maynard R. Wilbur
Assistant Examiner—S. C. Buczinski
Attorney, Agent, or Firm—Julian C. Renfro, Esq.; Gay Chin, Esq.

[57] ABSTRACT

An electro-optical ranging system is disclosed for purposes of measuring or determining the distance from a transmitting/receiving location to an object, such as a target. An electro-optical transducer, such as a laser diode, is employed which exhibits the characteristic of emitting radiant energy in the infrared region when driven into a conductive condition and also exhibits the characteristic of being in a photovoltaic condition in response to receipt of radiant energy within the wavelength of the energy emitted. The transducer is periodically driven so as to emit radiant energy, and an optical directing means, such as an optical lens system, is employed for purposes of directing emitted energy from the transducer along a path toward the target as well as for receiving energy traveling in the opposite direction from the target and directing the received energy so as to impinge upon the transducer such that the transducer is actuated to a photovoltaic condition. An output circuit provides a first pulse each time the transducer is driven into conduction and a second output pulse each time the transducer is actuated into the photovoltaic conduction by received radiant energy. In this way, the time duration from the first pulse to the second pulse provides a representation of the distance of the target from the transducer.

11 Claims, 3 Drawing Figures

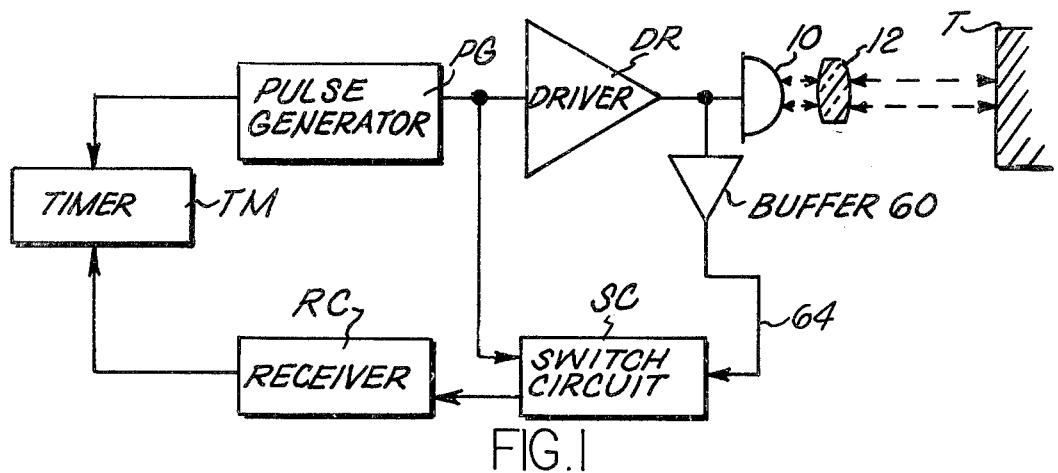
FIG. 1
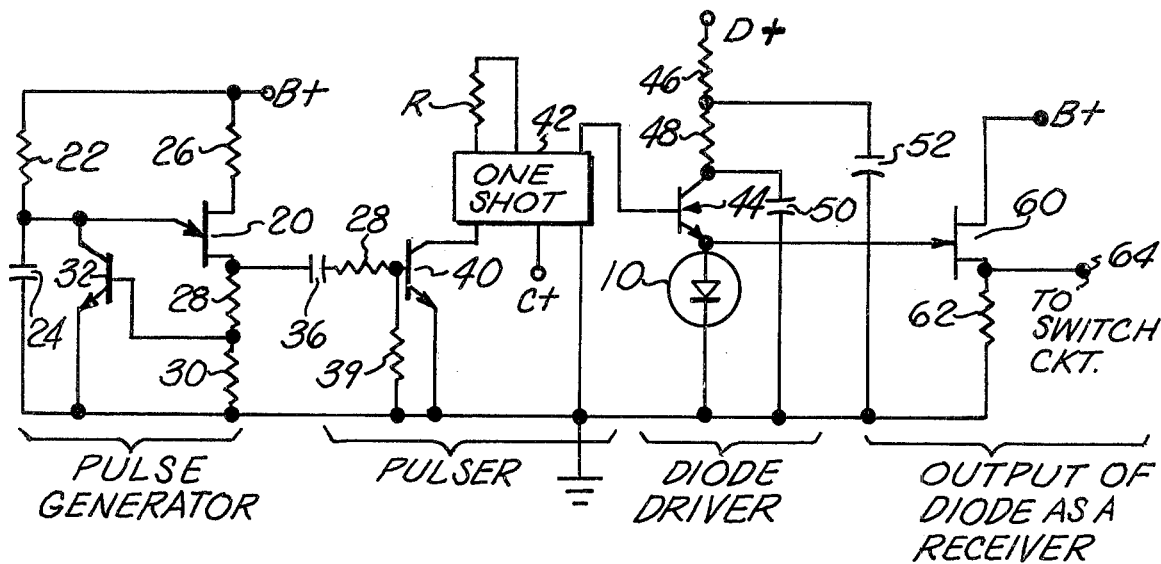
FIG. 2
FIG. 3
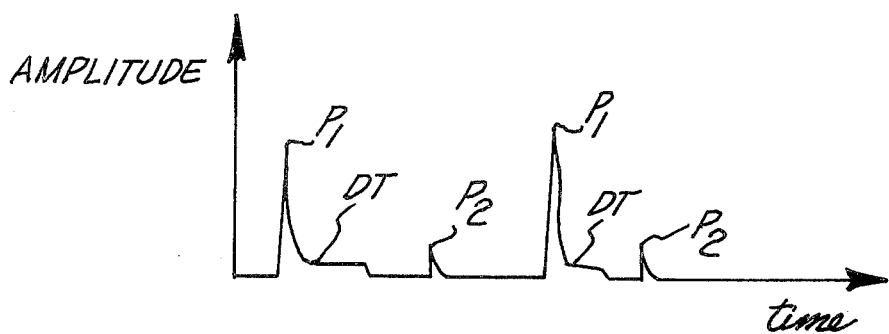

ized by referring to FIG. 1 there is provided a pulse

ELECTRO-OPTICAL RANGING MEANS

This invention is related to the art of distance measuring and more specifically to an improved electro-optical ranging system.

The invention is particularly applicable for use in conjunction with detecting the distance from a transmitting/receiving station to an object, such as a target and the like; although the invention may be employed in other applications such as in various applications which require information as to distance between two objects of which either or both may be moving.

It is known in the art to employ an electro-optical distance measuring system for determining the distance between two objects wherein radiant energy, such as a light beam, is transmitted from one object to the other and reflected back to the first object. Typically, the distance between the two objects is determined in dependence upon the time duration for the light beam to be transmitted from one object to the other and then returned to the first object. The transmitting/receiving object normally employs a transmitting transducer, such as a light emitting diode, and a separate receiving transducer, such as a photo-sensitive semiconductor. Consequently then, two separate optical directing systems must normally be provided; one for transmission of the radiated energy, and the other for reception of the returned radiant energy. If accuracy is to be attained in detecting the location of a remote object, these optical directing systems must be constructed so that the optical trains are aligned and maintained boresighted with each other. Also, care must be taken to ensure that the frequency spectrum or wavelength range of the received energy is the same as that of transmitted energy. This requires that the receiving transducer be responsive to the same frequency spectrum or wavelength range as that transmitted. To facilitate noise rejection, a critical filter should be employed in the return optical path, but the use of such a filter is disadvantageous from the standpoint of cost, and its use causes incoming signals to be limited to a narrow acceptance angle.

SUMMARY OF THE INVENTION

It is an object of the present invention to provide an electro-optical distance measuring system which employs a common electro-optical transducer for both transmission and reception of radiant energy so as to thereby permit use of the same optical train and alignment for both transmission and reception and eliminate the need for a critical filter.

It is a still further object of the present invention to provide an improved optical measuring system employing but a single light emitting diode for both transmission and reception of radiant energy in the infrared region.

It is a still further object of the present invention to provide an improved electro-optical ranging system which requires fewer components than that known in the art by employing a transceiver which includes a light emitting laser type diode which exhibits the characteristic of emitting radiant energy and responding to its own returned energy.

In accordance with the present invention, the electro-optical distance measuring system employs an electro-optical transducer, such as a light emitting diode, and which exhibits the characteristic of emitting radiant energy within a given infrared wavelength range when driven into a conductive condition and also exhibits the characteristic of being in a conductive condition in response to receipt of radiant energy within the given wavelength range. The transducer is controlled by circuitry which serves to periodically drive the transducer into conduction so as to thereby emit radiant energy. Optical directing facilities, such as a lens, directs the emitted energy from the transducer along a given path toward a target and directs received radiant energy, traveling in the opposite direction from the target, so as to impinge on the transducer. If the received energy is within the infrared wavelength range of the emitted energy, the transducer is actuated to a conductive condition. An output circuit provides a first pulse each time the transducer is driven into conduction and a second pulse each time the transducer is actuated into conduction by received radiant energy. The time duration between the first pulse and the second pulse is representative of the distance of the target from the transducer, and accordingly I provide suitable timing means in accordance with a preferred, range finder embodiment of my invention, such that range can be effectively and accurately measured.

DESCRIPTION OF THE DRAWINGS

The foregoing and other objects and advantages of the invention will become more readily apparent from the following description of the preferred embodiments of the invention, as taken in conjunction with the accompanying drawings, which are a part hereof, and wherein:

FIG. 1 is a block diagram illustration of the electro-optical distance measuring system of the invention;

FIG. 2 is a schematic illustration of the pulse generator, driver and buffer portions of FIG. 1; and FIG. 3 is a graphical illustration of signal amplitude with respect to time, illustrating a portion of the operation of the circuitry of FIGS. 1 and 2.

DESCRIPTION OF PREFERRED EMBODIMENTS

Referring now to the drawings, wherein the showings are for purposes of illustrating a preferred embodiment of the invention only and not for purposes of limiting same, FIG. 1 illustrates an electro-optical transducer which preferably takes the form of a light emitting diode 10. Diode 10 serves, when conductive, to emit radiant energy which is directed by an optical lens 12 along a path to a target T. Light reflected from the target T along the same path, but in the opposite direction, is directed by lens 12 so as to impinge upon the emitting-receiving surface of diode 10.

Preferably, diode 10 takes the form of that type of light emitting diode known as a laser diode. The laser diode is preferably a gallium arsenide (GaAs) diode or another laser diode exhibiting similar characteristics. The diode may be a TA7608 GaAs laser diode adapted to be driven into emission with a current pulse on the order of 7 amperes, peak value. The emitted radiant energy is in the infrared region with the wavelength being on the order of approximately 0.9 microns. Such a solid state gallium arsenide diode may be used to transmit intense, ultra short pulses or modulated continuous wave (CW) energy.

In accordance with this invention, such a laser diode may also be used as a detector of its own emitted energy and is operative in the photo voltaic mode. Consequently, it may detect such intense, ultra short pulses or modulated continuous wave energy returned to the diode by reflection from a target. Only a single optical train is required for transmission and reception of this energy. Since the diode is responsive only to energy within a narrow bandwidth, corresponding essentially to the wavelength emitted, filtering requirements are advantageously minimized. The diode automatically rejects background energy adjacent to the spectral region of emission and thereby eliminates the necessity and expense of employing a critical filter, as is used in electro-optical systems which employ separate transmitters and receivers.

The application of the invention, as illustrated in the embodiment of FIG. 1, employs circuitry for driving the laser diode 10 into conduction so as to emit radiant energy in the infrared region at a wavelength on the order of 0.9 microns and then provide an indication at the point in time that the laser diode is actuated into conduction in response to receipt of its own returned energy, as reflected from the target T. To achieve this, a suitable pulse generator PG provides pulses which are amplified by a driver circuit DR to effectively pump the laser diode 10. The pulse generator and the driver may be deemed to be transducer control means. Preferably, a receiver RC is synchronized to this operation so that it is turned off during each driving pulse. The driving pulse starts the operation of a conventional timer TM which then times the period while waiting for the diode 10 to sense its own returned energy. In this application of my invention, a return pulse is obtained when the diode senses its own returned energy. A switching circuit SC and the receiver RC may respond to this pulse to stop the timer TM so that an indication may be obtained as to the range of the object reflecting energy back to the diode.

It is apparent that those skilled in the art may provide various different types of circuitry to achieve control of the transmit-receiving operation of the optical ranging system illustrated in block diagram form in FIG. 1. However, to further assist those skilled in the art, reference is made to the circuitry illustrated in FIG. 2 which may be employed in practicing this invention. Here, a unijunction transistor 20, which may be of the type known as 2N491, serves as the principal component of the pulse generator. This transistor is incorporated in an RC relaxation oscillator circuit so that it provides output pulses spaced in time at a rate as determined by the value of a resistor 22 and capacitor 24. Resistor 22 and capacitor 24 are connected in series from ground to a source of B+ potential, which may be on the order of +12 volts. As is known to those skilled in the art, once the capacitor 24 is sufficiently charged, transistor 20 will fire so that current flows from the capacitor and through the transistor to achieve current flow through resistors 28 and 30. These resistors are connected between the lower base electrode of the transistor and ground and serve as a voltage divider. The positive voltage developed across resistor 30 is employed to bias an NPN transistor 32 into conduction to completely discharge capacitor 24. Resistor 26 connects the upper base electrode of transistor 20 to the B+ voltage supply source.

Each time the unijunction transistor 20 is triggered into conduction to develop a voltage across resistors 28 and 30, this voltage pulse is supplied through a coupling capacitor 36 and a resistor 38 to develop a voltage across a resistor 39 to bias an NPN transistor 40 into conduction. This, in turn, actuates a one shot circuit 42 which serves to provide a shaped positive pulse of a fixed time duration. One shot circuit 42 is conventional and, for example, may take the form known as type 9601 having a suitable bias resistor R. The one shot circuit is connected to a C+ voltage supply source, which may be on the order of +5 volts. The shaped and time limited output pulse obtained from the one shot circuit 42 is employed as a trigger pulse which serves to drive a transistor 44 into conduction.

Transistor 44, also known as the driver, is an NPN transistor which, upon receiving the trigger pulse from one shot circuit 44 at its base electrode, is driven into an avalanche mode for purposes of driving the laser diode 10 into emission. To achieve this, there is provided a relatively high DC voltage supply source D+, on the order of +67.5 volts. The supply source is connected to the collector of the transistor 44 through series connected resistors 46 and 48. As illustrated in FIG. 2, the current path from the D+ voltage supply source to ground includes these two resistors, the collector to emitter path of transistor 44 and diode 10. Smoothing capacitors 50 and 52 are respectively connected between ground and the collector of transistor 44 and between ground and a junction of resistors 46 and 48. These components are all chosen such that when one shot circuit 42 provides a positive trigger pulse, transistor 44 will be driven into an avalanche mode to provide a relatively large current pulse, having a peak value preferably on the order of about 7.0 amperes, to pump the laser diode 10. Diode 10 is driven into an emission mode so as to emit radiant energy in the infrared range and preferably the emission provides narrow band coherent energy at a wavelength of approximately 0.9 microns.

The laser diode will be conductive in response to receipt of radiant energy of a wavelength on the order of 0.9 microns. Each time diode 10 is conductive, this condition is sensed by a field effect transistor 60 which has its gate connected to the junction of the diode 10 and the emitter of transistor 44 and which serves as a buffer. The source-drain path of this transistor is connected in series with a load resistor 62 between ground the B+ voltage supply source. Each time diode 10 is conductive, by means of a connection to the gate of transistor 60, this device is biased into conduction to develop a voltage pulse across resistor 62.

Reference is now made to FIG. 3 which illustrates a typical pattern of output pulses obtained between ground and the output terminal 64. Pulse $P_1$ is a relatively sharp, high amplitude pulse which represents the firing pulse applied to diode 10. The time period immediately following pulse $P_1$ may be considered as a dead time DT. At this point, the circuitry is in a static condition waiting for diode 10 to sense the return of its own energy as reflected from the target T. Diode 10 becomes conductive upon receipt of its own returned energy. This is buffered by the field effect transistor 60 so that an output pulse $P_2$ is provided at the output terminal 64. Whereas output pulse $P_2$ is of substantially less magnitude than that of the firing pulse $P_1$, it is sufficient to be detected by the field effect transistor 60. Consequently then, the time duration which elapses from pulse $P_1$ to pulse $P_2$ may be measured, as with timer TM, for purposes of providing an output indication as to the distance between diode 10 and target T.

Although I am not to be limited to the following components and/or component values, they are nevertheless representative of a preferred embodiment of my invention:

| 10 | GaAs diode | TA7608 |
|---|---|---|
| 20 | transistor | 2N491 |
| 22 | resistor | 27K |
| 24 | capacitor | 6.8 microfarads |
| 26 | resistor | 220 ohms |
| 28 | resistor | 220 ohms |
| 30 | resistor | 100 ohms |
| 32 | transistor | 2N2222 |
| 36 | capacitor | .01 microfarads |
| 38 | resistor | 1K |
| 39 | resistor | 10K |
| 40 | transistor | 2N2222 |
| 42 | one shot multivibrator | 9601 (TI) |
| 44 | transistor | 2N2222 |
| 46 | resistor | 47K |
| 48 | resistor | 47K |
| 50 | capacitor | .0022 microfarads |
| 52 | capacitor | .01 microfarads |
| 60 | FET | 2N3822 |
| 62 | resistor | 10K |

Although the invention has been described in conjunction with a preferred embodiment, it is to be appreciated that various modifications and arrangements may be made without departing from the scope of the invention as defined in the appended claims.

I claim:

1. An electro-optical distance measuring system comprising:
    electro-optical transducer means exhibiting the characteristic of emitting radiant energy within a given infrared wavelength range when driven into a conductive condition, and exhibiting a photo voltaic condition in response to receipt of radiant energy within said given infrared wavelength range,
    transducer control means including means for periodically driving said transducer means into conduction so as to emit radiant energy,
    optical directing means for directing said emitted energy from said transducer means along a given path toward a target, and for receiving radiant energy traveling in the opposite direction along said given path from said target toward said optical directing means, said directing means directing said received energy to said transducer means so that said transducer means is actuated to the photo voltaic condition upon receipt of radiant energy within said given infrared wavelength range, and
    output circuit means for providing a first pulse each time said transducer means is driven into conduction and a second output pulse each time said transducer means is actuated into photo voltaic operation by said received radiant energy whereby the time duration from said first pulse to said second pulse is representative of the distance of said target from said transducer means.

2. An electro-optical distance measuring system as set forth in claim 1, wherein said transducer means is a solid state light emitting diode exhibiting the characteristic of emitting radiant energy in the infrared region.

3. An electro-optical distance measuring system as set forth in claim 1 wherein said transducer means exhibits the characteristic of lasing when driven into conduction so as to emit light energy.

4. An electro-optical distance measuring system as set forth in claim 3 wherein said transducer is a solid state, P-N junction laser diode.

5. An electro-optical measuring system as set forth in claim 3 wherein said transducer means is a solid state gallium arsenide light emitting diode for emitting radiant energy at a wavelength on the order of 0.9 microns.

6. An electro-optical distance measuring system as set forth in claim 5 wherein said transducer means exhibits a photovoltaic characteristic in that it is photovoltaic in response to received radiant energy at a wavelength on the order of 0.9 microns.

7. An electro-optical distance measuring system as set forth in claim 1 wherein said optical directing means includes a lens defining a common optical path for transmission and reception of said transmitted and received radiant energy.

8. An electro-optical distance measuring system comprising:
    electro-optical transducer means, having a first normal condition and a second actuated condition, said transducer means exhibiting the characteristic of emitting radiant energy in the infrared region within a given wavelength range when actuated to its second condition and exhibiting the characteristic of photovoltaically detecting received radiant energy in the infrared region within said given wavelength range when in its first condition,
    control means for periodically applying an electrical potential to said transducer means to drive said transducer means to said second condition, and
    output means for providing a first pulse when said control means applies an electrical potential to said transducer means, and including circuitry for providing an output pulse whenever said transducer means receives radiant energy in the infrared region within said given wavelength range while in its first condition, whereby the time duration from said first pulse to said second pulse is representative of the distance of a target from said transducer means.

9. An electro-optical distance measuring system as set forth in claim 8, wherein said transducer means is a laser emitting means and said control means includes circuit means for periodically energizing said laser emitting means.

10. An electro-optical distance measuring system as set forth in claim 9, wherein said laser emitting means is a solid state, laser diode.

11. An electro-optical distance measuring system as set forth in claim 10, including optical directing means for directing emitted radiant energy from said laser diode toward a target and directing received radiant energy toward said laser diode.

* * * * *